United States Patent
Murayama (10) Patent No.: US 11,068,108 B2
(45) Date of Patent: Jul. 20, 2021

(54) INPUT DEVICE

(71) Applicant: FUNAI ELECTRIC CO., LTD., Osaka (JP)

(72) Inventor: Manabu Murayama, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/813,762

(22) Filed: Mar. 10, 2020

(65) Prior Publication Data

US 2020/0319750 A1    Oct. 8, 2020

(30) Foreign Application Priority Data

Apr. 2, 2019 (JP) .............................. JP2019-070743

(51) Int. Cl.
*G06F 3/042* (2006.01)
*G06F 3/0481* (2013.01)

(52) U.S. Cl.
CPC ........ *G06F 3/0421* (2013.01); *G06F 3/04812* (2013.01); *G06F 2203/04106* (2013.01); *G06F 2203/04108* (2013.01)

(58) Field of Classification Search
CPC ............... G06F 3/0421; G06F 3/04812; G06F 2203/04106; G06F 2203/04108
USPC ........................................................ 345/175
See application file for complete search history.

(56) References Cited

U.S. PATENT DOCUMENTS

| 2014/0028557 | A1 | 1/2014 | Otake et al. |
| 2014/0340343 | A1* | 11/2014 | Han ........................ G06F 3/041 345/173 |
| 2017/0038861 | A1 | 2/2017 | Maekawa et al. |
| 2017/0329458 | A1 | 11/2017 | Kanemaru et al. |

FOREIGN PATENT DOCUMENTS

JP    2014067071    4/2014

* cited by examiner

*Primary Examiner* — Chanh D Nguyen
*Assistant Examiner* — Ngan T. Pham-Lu
(74) *Attorney, Agent, or Firm* — JCIPRNET (57) ABSTRACT

An input device capable of precisely determining presence or absence of a specific non-contact operation on an operation screen is provided. An input device includes a display control unit that displays an operation screen on a display surface, a first detection unit that detects a passing state of an object in a first sensing layer in air formed to face the display surface, a second detection unit that detects a passing state of the object in a second sensing layer in air formed between the display surface and the first sensing layer, and a determination unit that determines presence or absence of the specific non-contact operation performed by the object based on respective detection results of the first detection unit and the second detection unit.

8 Claims, 9 Drawing Sheets

INPUT DEVICE

CROSS REFERENCE TO RELATED APPLICATIONS

This application claims the priority benefit of Japanese Patent Application No. 2019-070743, filed on Apr. 2, 2019. The entirety of the above-mentioned patent application is hereby incorporated by reference herein and made a part of this specification.

BACKGROUND OF THE DISCLOSURE

Technical Field

The disclosure relates to an input device for receiving a specific non-contact operation performed on an operation screen by an object.

Related Art

In the food processing field and the medical field where hygiene management is strict, it is not preferable to use a touch panel display with which a finger of a user is in direct contact since the touch panel display may become a pathogen infection source. For this reason, in each of the aforementioned fields, it has been proposed to use an input device for receiving a specific non-contact operation performed on the operation screen by the finger of the user (for example, see patent literature 1 (Japanese Patent Application Laid-open No. 2014-67071)).

A conventional input device forms an aerial image (real image) indicating an operation screen in an aerial display area, and detects movement of a finger of a user in a detection area facing the aerial image, thereby determining that a specific non-contact operation on the operation screen has been performed.

However, in the aforementioned conventional input device, for example, when a part of the body of the user unintentionally passes through the detection area, there is a risk of erroneous determination that a specific non-contact operation on the operation screen has been performed.

The disclosure provides an input device that can precisely determine the presence or absence of a specific non-contact operation on an operation screen.

SUMMARY

According to one embodiment of the disclosure, it provides an input device for receiving a specific non-contact operation performed on an operation screen by an object, including: a display control unit that displays the operation screen on a display surface; a first detection unit that detects a passing state of the object in a first sensing layer in air formed to face the display surface; a second detection unit that detects a passing state of the object in a second sensing layer in air formed between the display surface and the first sensing layer, and a determination unit that determines presence or absence of the specific non-contact operation performed by the object based on respective detection results of the first detection unit and the second detection unit.

DESCRIPTION OF THE EMBODIMENTS

Hereinafter, embodiments of the disclosure will be described in detail with reference to the drawings. Moreover, it should be noted that each of the embodiments described below shows a comprehensive or specific example. Numerical values, shapes, materials, components, arrangement positions and connection forms of the components, etc. shown in the following embodiments are merely examples, and are not intended to limit the disclosure. In addition, among the components in the following embodiments, components that are not described in the independent claims are described as arbitrary components.

Embodiment 1

[1-1. Configuration of Input Device]

Figure 1:
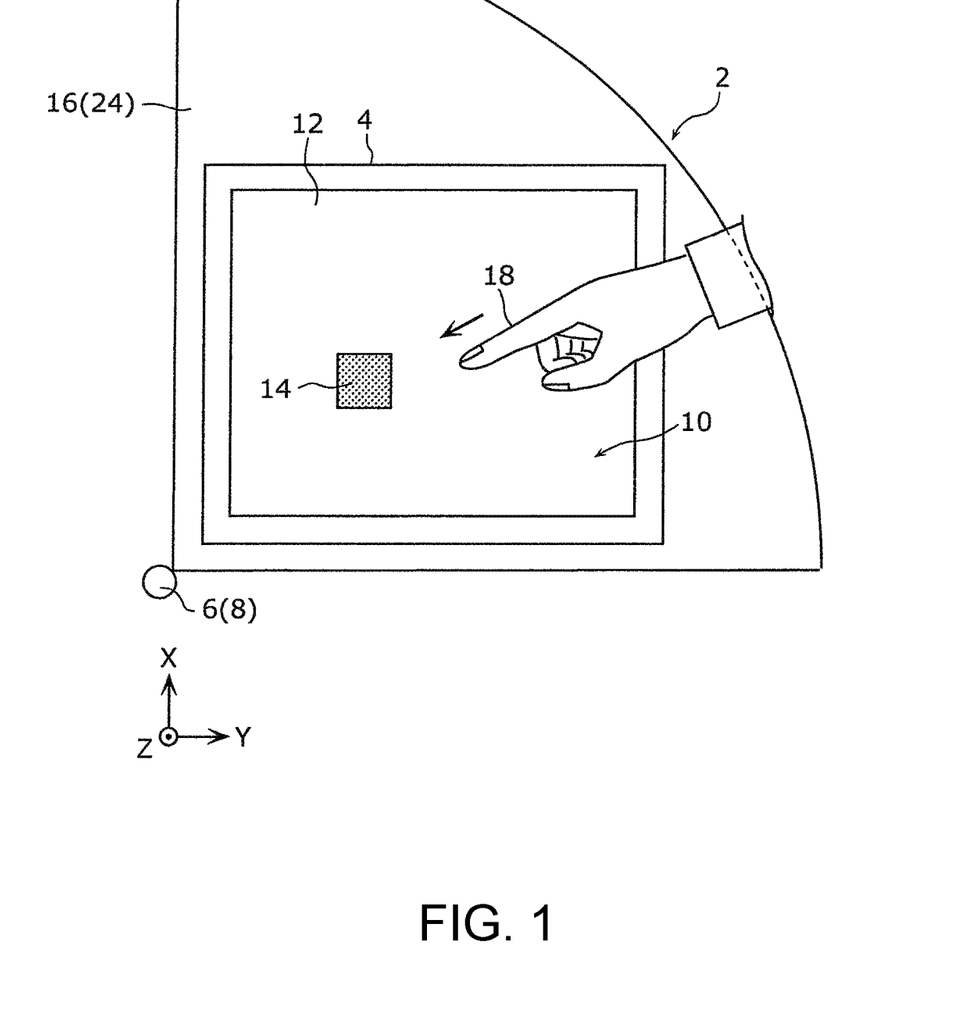
FIG. 1 is a plan view illustrating an input device according to Embodiment 1.
Figure 2:
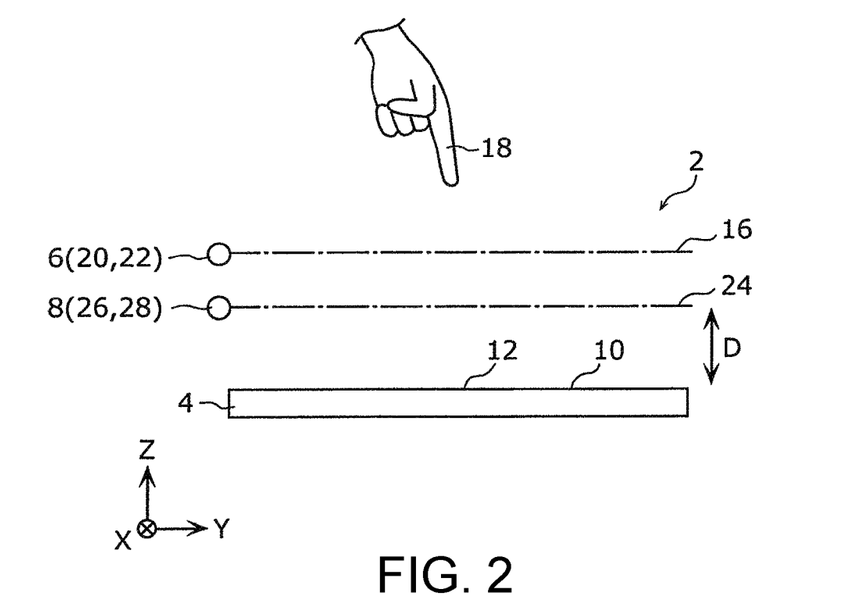
FIG. 2 is a side view illustrating the input device according to Embodiment 1.
Figure 3:
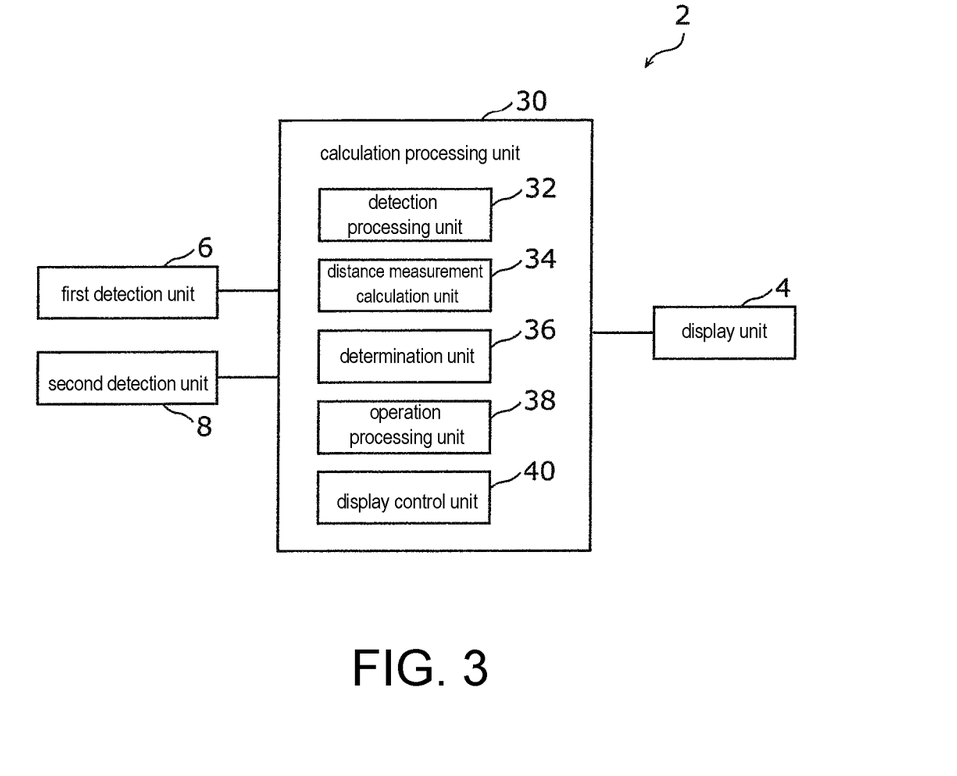
FIG. 3 is a block diagram illustrating a configuration of the input device according to Embodiment 1.

First, a configuration of an input device 2 according to Embodiment 1 is described with reference to FIG. 1 to FIG. 3. FIG. 1 is a plan view illustrating the input device 2 according to Embodiment 1. FIG. 2 is a side view illustrating the input device 2 according to Embodiment 1. FIG. 3 is a block diagram illustrating a configuration of the input device 2 according to Embodiment 1.

As illustrated in FIG. 1 and FIG. 2, the input device 2 includes a display unit 4, a first detection unit 6, and a second detection unit 8. The input device 2 is applied as a user interface for operating a device (not illustrated) used in, for example, the food processing field or the medical field in a non-contact manner by an object 18 (for example, a finger of a user).

The display unit 4 is, for example, a liquid crystal display panel. The display unit 4 has a display surface 12 for displaying an operation screen 10. The operation screen 10 is, for example, a menu screen or the like for operating the device. In the example illustrated in FIG. 1, an icon 14 (an example of a predetermined display) indicating an operation menu or the like of the device is displayed on the operation screen 10.

The first detection unit 6 detects a passing state of the object 18 in a first sensing layer 16 in air formed to face the display surface 12 of the display unit 4. Specifically, the first detection unit 6 detects the number of passage places of the object 18 in the first sensing layer 16.

The first sensing layer 16 corresponds to a virtual plane (XY plane) formed at an aerial position substantially parallel to the display surface 12 of the display unit 4. In addition, the passage place of the object 18 in the first sensing layer 16 refers to a cross-sectional region of the object 18 in the first sensing layer 16. For example, when one finger of the user passes through the first sensing layer 16, there is one passage place of the object 18 in the first sensing layer 16. Further, for example, when two fingers of the user pass through the first sensing layer 16, there are two passage places of the object 18 in the first sensing layer 16.

The first detection unit 6 includes, for example, a scan sensor, and is disposed to face a corner of the display unit 4 as illustrated in FIG. 1. As illustrated in FIG. 2, the first detection unit 6 includes a first light emitting unit 20 and a first light receiving unit 22. The first light emitting unit 20 scans an infrared laser in the first sensing layer 16 in two-dimensional manner. The first light receiving unit 22 receives and detects light reflected by the object 18 passing through the first sensing layer 16.

The second detection unit 8 detects a passing state of the object 18 in a second sensing layer 24 in air formed between the display surface 12 of the display unit 4 and the first sensing layer 16. Specifically, the second detection unit 8 detects the number of passage places of the object 18 in the second sensing layer 24. As illustrated in FIG. 2, a distance D between the second sensing layer 24 and the display surface 12 of the display unit 4 is a size (for example, about 1 cm to several centimeters) at which the object 18 does not directly come into contact with the display surface 12 of the display unit 4 when the object 18 passes through the second sensing layer 24.

Moreover, the second sensing layer 24 is a virtual plane (XY plane) formed at an aerial position substantially parallel to the display surface 12 of the display unit 4. In addition, the passage place of the object 18 in the second sensing layer 24 refers to a cross-sectional region of the object 18 in the second sensing layer 24. For example, when one finger of the user passes through the second sensing layer 24, there are one passage place of the object 18 in the second sensing layer 24. Further, for example, when two fingers of the user pass through the second sensing layer 24, there are two passage places of the object 18 in the second sensing layer 24.

The second detection unit 8 includes, for example, a scan sensor, and is disposed to face the corner of the display unit 4 as illustrated in FIG. 1. As illustrated in FIG. 2, the second detection unit 8 includes a second light emitting unit 26 and a second light receiving unit 28. The second light emitting unit 26 scans an infrared laser in the second sensing layer 24 in a two-dimensional manner. The second light receiving unit 28 receives and detects light reflected by the object 18 passing through the second sensing layer 24.

As illustrated in FIG. 3, the input device 2 further includes a calculation processing unit 30. The calculation processing unit 30 includes a detection processing unit 32, a distance measurement calculation unit 34, a determination unit 36, an operation processing unit 38, and a display control unit 40.

The detection processing unit 32 computes the number of passage places of the object 18 in the first sensing layer 16 based on a detection signal from the first detection unit 6. In addition, the detection processing unit 32 computes the number of passage places of the object 18 in the second sensing layer 24 based on a detection signal from the second detection unit 8.

The distance measurement calculation unit 34 computes a position (two-dimensional coordinates) of the object 18 in the first sensing layer 16 based on a detection signal from the first detection unit 6. In addition, the distance measurement calculation unit 34 computes a position (two-dimensional coordinates) of the object 18 in the second sensing layer 24 based on a detection signal from the second detection unit 8.

The determination unit 36 determines the presence or absence of a specific non-contact operation performed on the operation screen 10 made by the object 18 based on respective computation results of the detection processing unit 32 and the distance measurement calculation unit 34. Moreover, the specific non-contact operation is, for example, a non-contact single touch gesture, multi-touch gesture, etc. performed by the finger of the user on the operation screen 10. The single touch gesture is a gesture performed by one finger (for example, the index finger) of the user, and is, for example, a gesture such as a tap. The multi-touch gesture is a gesture performed by two fingers (for example, the index finger and the thumb) of the user, and is, for example, a gesture such as pinch-in, pinch-out, rotation, etc. A determination process by the determination unit 36 will be described later in detail.

The operation processing unit 38 executes processing corresponding to the specific non-contact operation based on a computation result of the distance measurement calculation unit 34 and a determination result of the determination unit 36. For example, when the user performs a single touch gesture on the icon 14 on the operation screen 10 in a non-contact manner, the operation processing unit 38 executes a process of selecting the icon 14, etc. In addition, for example, when the user performs a multi-touch gesture on the operation screen 10 in a non-contact manner, the operation processing unit 38 executes a process of enlarging or reducing the display magnification of the operation screen 10, etc.

The display control unit 40 controls display content on the display surface 12 of the display unit 4. Specifically, the display control unit 40 executes a process of displaying the operation screen 10 on the display surface 12 of the display unit 4. In addition, based on respective computation results of the detection processing unit 32 and the distance measurement calculation unit 34, the display control unit 40 executes a process of displaying a cursor 42 (see (b) of FIG. 5A described later) on the operation screen 10 when the object 18 passes through the first sensing layer 16. In this instance, the cursor 42 is displayed at a position on the operation screen 10 corresponding to a position of the object 18 in the first sensing layer 16.

[1-2. Operation of Input Device]

Figure 4:
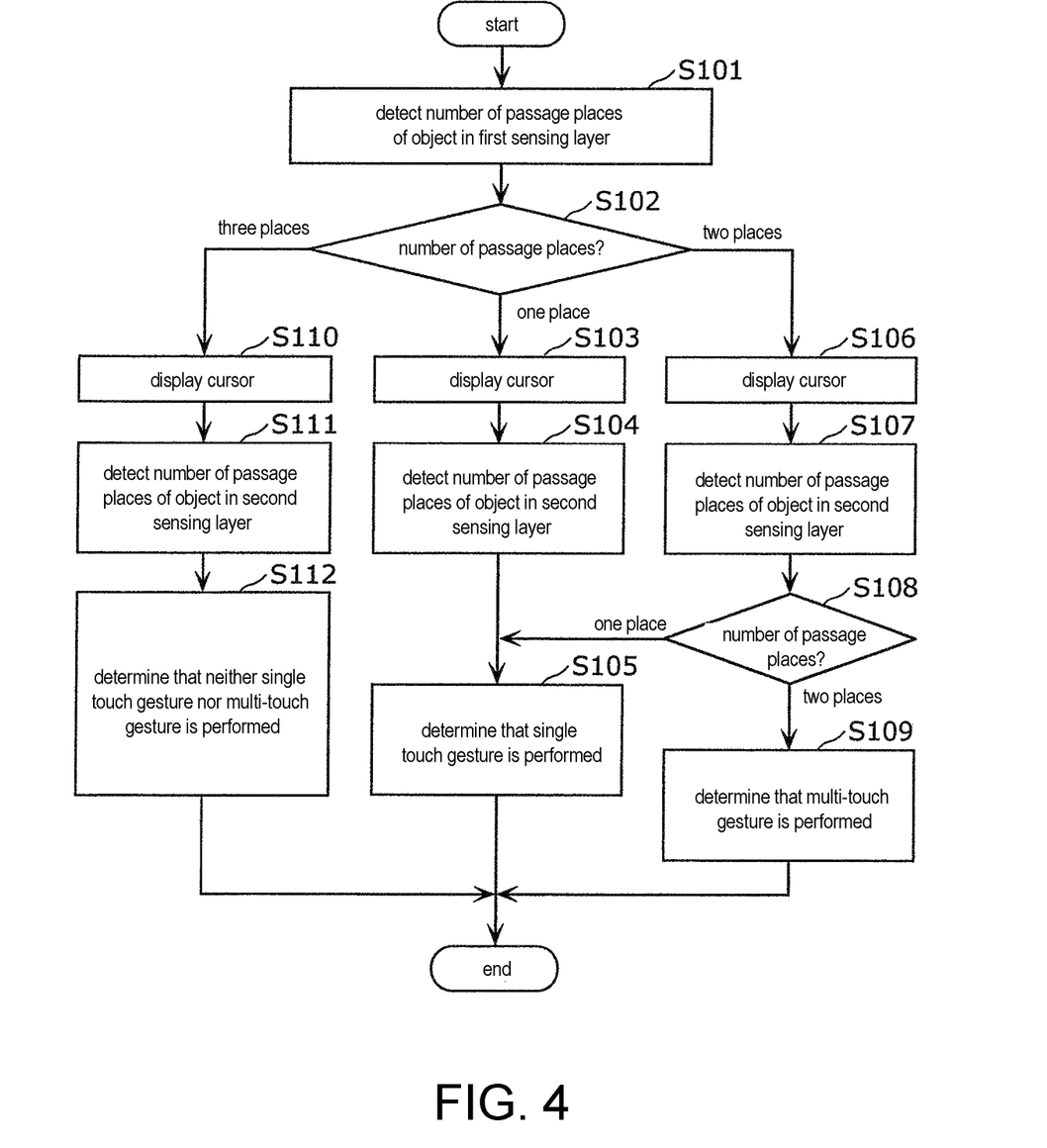
FIG. 4 is a flowchart illustrating an operation flow of the input device according to Embodiment 1.
Figure 5A:
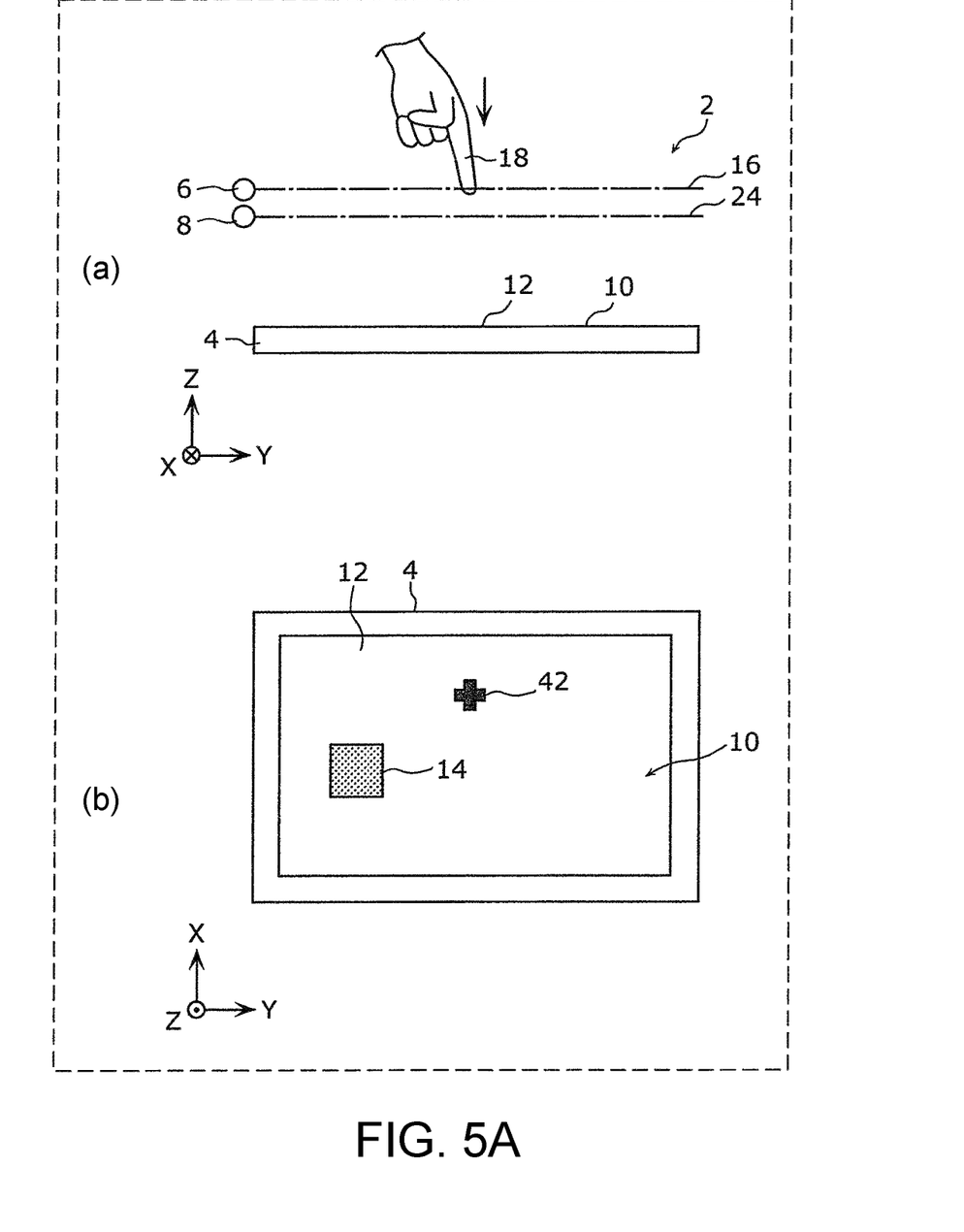
FIG. 5A is a diagram for description of a state in which an object passes through a first sensing layer at one place in the input device according to Embodiment 1.
Figure 5B:
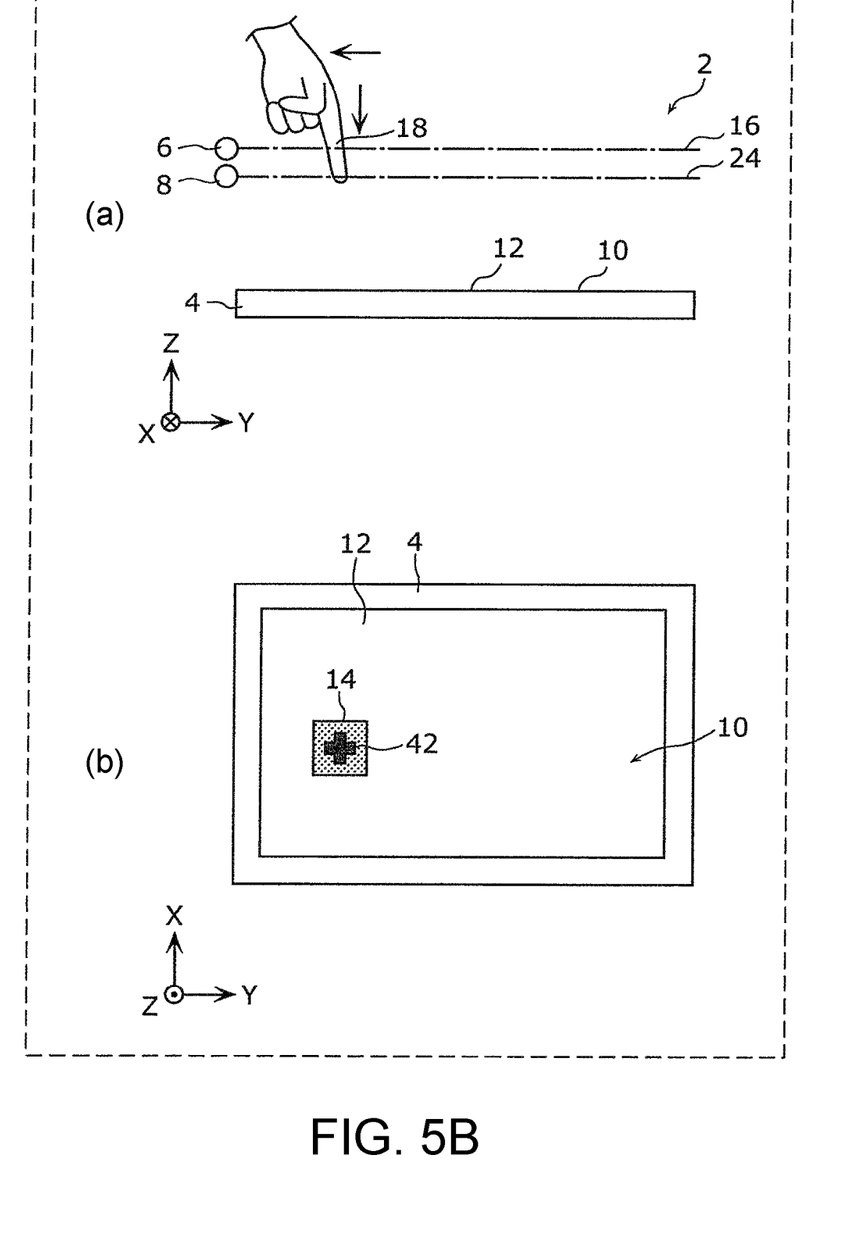
FIG. 5B is a diagram for description of a state in which the object passes through a second sensing layer at one place in the input device according to Embodiment 1.
Figure 6:
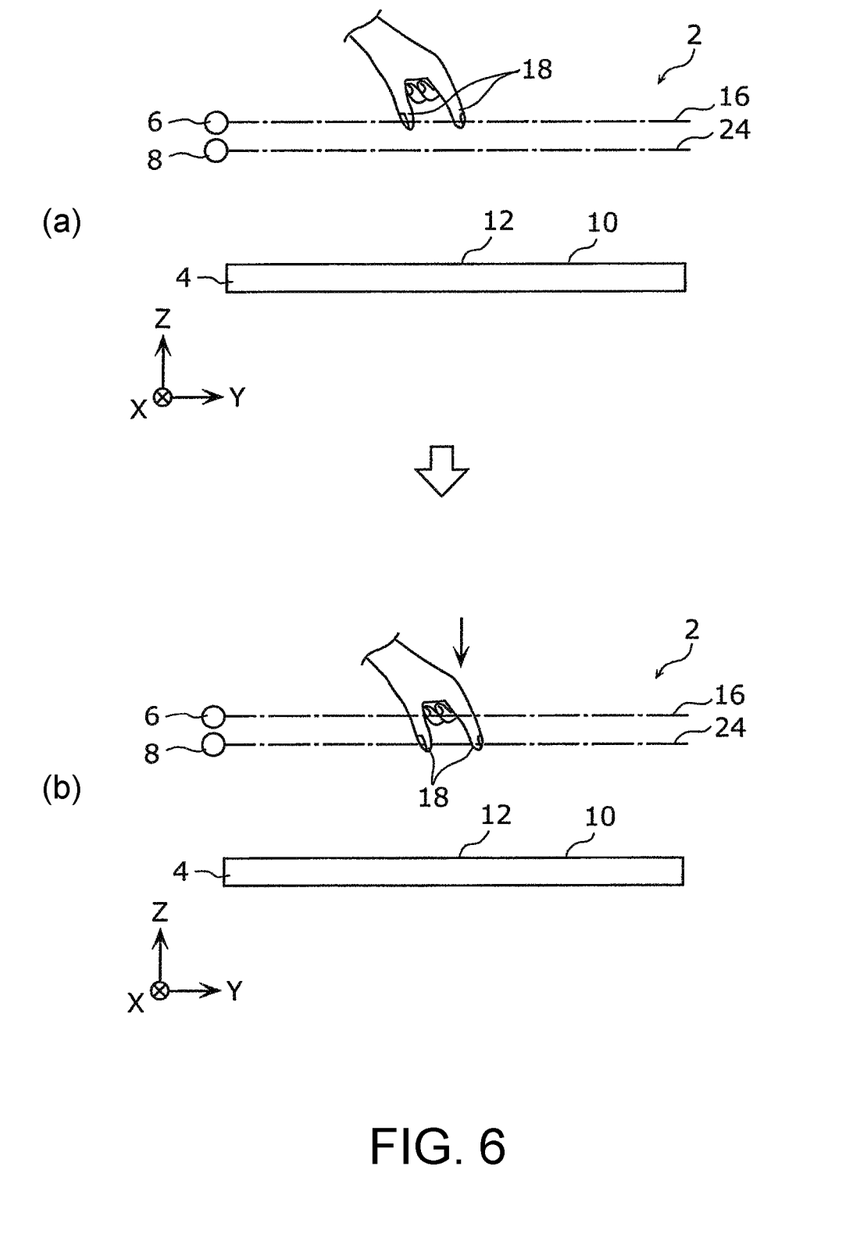
FIG. 6 is a diagram for description of a state in which the object passes through each of the first sensing layer and the second sensing layer at two places in the input device according to Embodiment 1.
Figure 7:
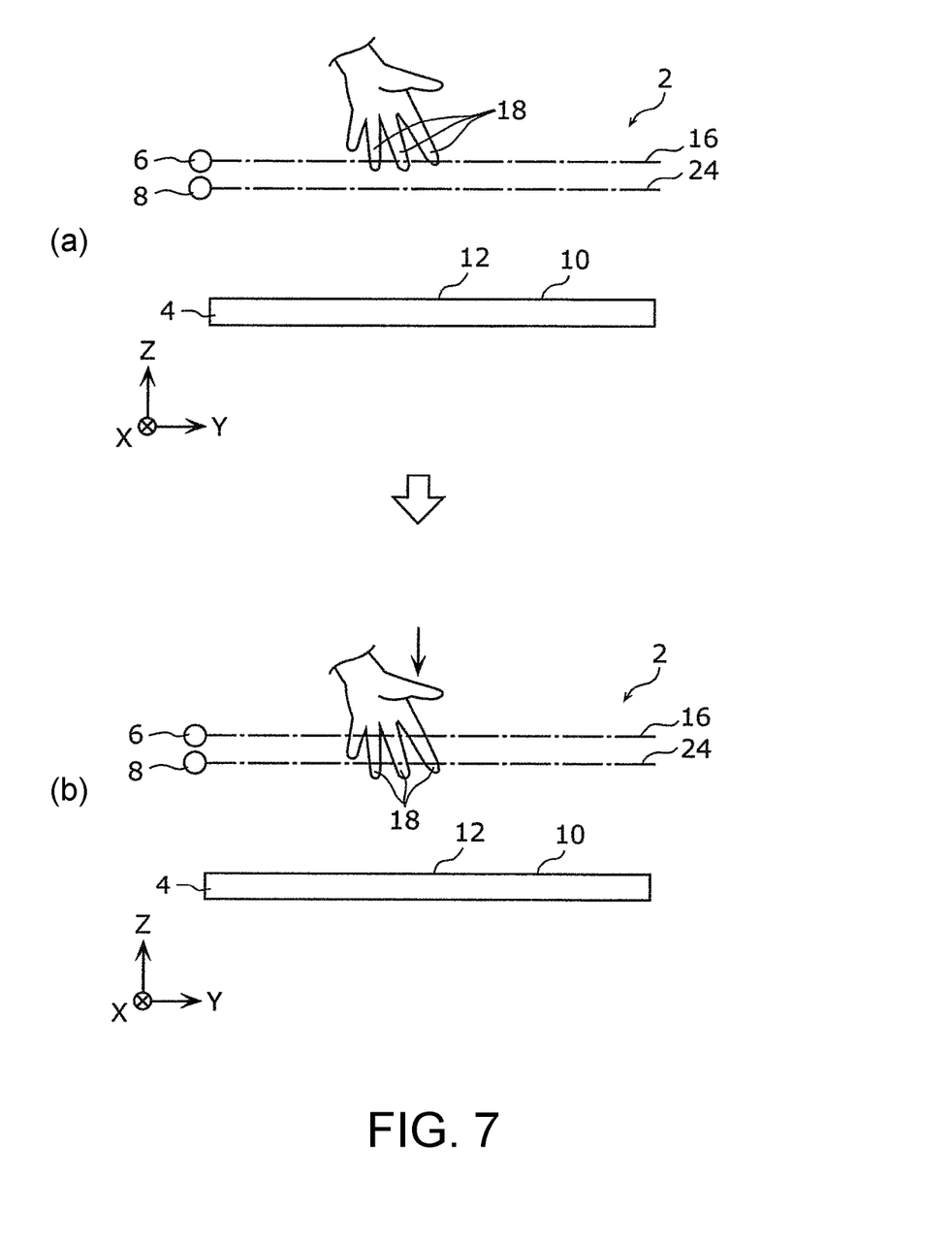
FIG. 7 is a diagram for description of a state in which the object passes through each of the first sensing layer and the second sensing layer at three places in the input device according to Embodiment 1.

Next, an operation of the input device 2 according to Embodiment 1 is described with reference to FIG. 4 to FIG. 7. FIG. 4 is a flowchart illustrating an operation flow of the input device 2 according to Embodiment 1. FIG. 5A is a diagram for description of a state in which the object 18 passes through the first sensing layer 16 at one place in the input device 2 according to Embodiment 1. FIG. 5B is a diagram for description of a state in which the object 18 passes through the second sensing layer 24 at one place in the input device 2 according to Embodiment 1. FIG. 6 is a diagram for description of a state in which the object 18 passes through each of the first sensing layer 16 and the second sensing layer 24 at two places in the input device 2 according to Embodiment 1. FIG. 7 is a diagram for description of a state in which the object 18 passes through each of the first sensing layer 16 and the second sensing layer 24 at three places in the input device 2 according to Embodiment 1.

First, an operation of the input device 2 in the case that the user performs a single touch gesture is described with reference to FIG. 4 to FIG. 5B.

As illustrated in FIG. 4 and (a) of FIG. 5A, when one finger of the user passes through the first sensing layer 16, the first detection unit 6 detects the number of passage places of the object 18 (one finger) in the first sensing layer 16 (S101). The detection processing unit 32 computes the number of passage places of the object 18 in the first sensing layer 16 as "one place" based on a detection signal from the first detection unit 6 ("one place" in S102).

As illustrated in (b) of FIG. 5A, the display control unit 40 displays the cursor 42 on the operation screen 10 when the object 18 passes through the first sensing layer 16 based on respective computation results of the detection processing unit 32 and the distance measurement calculation unit 34 (S103). In this state, by the user moving one finger along the first sensing layer 16 (that is, in the XY plane), the cursor 42 moves on the operation screen 10 following movement of the finger of the user. A sound may be output from a speaker (not illustrated) of the display unit 4 at the same time as the cursor 42 is displayed on the operation screen 10.

Thereafter, as illustrated in (a) of FIG. 5B, when the user passes one finger through the second sensing layer 24, the second detection unit 8 detects the number of passage places of the object 18 (one finger) in the second sensing layer 24 (S104). The detection processing unit 32 computes the number of passage places of the object 18 in the second sensing layer 24 as "one place" based on a detection signal from the second detection unit 8. Moreover, when one finger of the user passes through the first sensing layer 16, there is one passage place of the object 18 in the second sensing layer 24 at all times. As illustrated in (b) of FIG. 5B, when the object 18 passes through the second sensing layer 24 at one place in a state that the cursor 42 is superimposed on the icon 14, the determination unit 36 determines that a single touch gesture is performed (S105).

Moreover, when the single touch gesture is performed, a dedicated button or icon other than the icon 14 may be displayed on the operation screen 10.

Next, an operation of the input device 2 when the user performs a multi-touch gesture is described with reference to FIG. 4 and FIG. 6.

As illustrated in FIG. 4 and (a) of FIG. 6, when two fingers (for example, index finger and thumb) of the user pass through the first sensing layer 16, the first detection unit 6 detects the number of passage places of the object 18 (two fingers) in the sensing layer 16 (S101). The detection processing unit 32 computes the number of passage places of the object 18 in the sensing layer 16 as "two places" based on a detection signal from the first detection unit 6 ("two places" in S102).

Based on respective computation results of the detection processing unit 32 and the distance measurement calculation unit 34, the display control unit 40 displays the cursor 42 (see (b) of FIG. 5A) on the operation screen 10 when the object 18 passes through the first sensing layer 16 (S106).

Thereafter, when the user passes the finger through the second sensing layer 24, the second detection unit 8 detects the number of passage places of the object 18 (finger) in the second sensing layer 24 (S107). Moreover, when two fingers of the user pass through the first sensing layer 16, the number of passage places of the object 18 in the second sensing layer 24 is two or one.

As illustrated in (b) of FIG. 6, when two fingers of the user pass through the second sensing layer 24, the detection processing unit 32 computes the number of passage places of the object 18 in the second sensing layer 24 as "two places" based on a detection signal from the second detection unit 8 ("two places" in S108). When the object 18 passes through the second sensing layer 24 at two places, the determination unit 36 determines that a multi-touch gesture has been performed (S109).

On the other hand, when one finger of the user passes through the second sensing layer 24, the detection processing unit 32 computes the number of passage places of the object 18 in the second sensing layer 24 as "one place" based on a detection signal from the second detection unit 8 ("one place" in S108). The determination unit 36 determines that a single touch gesture is performed after a predetermined waiting time elapses from the time the object 18 passes through the second sensing layer 24 at one place (S105).

Next, an operation of the input device 2 when three fingers of the user unintentionally pass through each of the first sensing layer 16 and the second sensing layer 24 is described with reference to FIG. 4 and FIG. 7.

As illustrated in FIG. 4 and (a) of FIG. 7, when three fingers (for example, index finger, middle finger, and ring finger) of the user pass through the first sensing layer 16, the first detection unit 6 detects the number of passage places of the object 18 (three fingers) in the first sensing layer 16 (S101). The detection processing unit 32 computes the number of passage places of the object 18 in the first sensing layer 16 as "three places" based on a detection signal from the first detection unit 6 ("three places" in S102).

Based on respective computation results of the detection processing unit 32 and the distance measurement calculation unit 34, the display control unit 40 displays the cursor 42 (see (b) of FIG. 5A) on the operation screen 10 when the object 18 passes through the first sensing layer 16 (S110).

Thereafter, when the fingers of the user pass through the second sensing layer 24, the second detection unit 8 detects the number of passage places of the object 18 (finger) in the second sensing layer 24 (S111). Moreover, when three fingers of the user pass through the first sensing layer 16, the number of passage places of the object 18 in the second sensing layer 24 is three or fewer.

As illustrated in (b) of FIG. 7, when three fingers of the user pass through the second sensing layer 24, the detection processing unit 32 computes the number of passage places of the object 18 in the second sensing layer 24 as "three places" based on a detection signal from the second detection unit 8. When the object 18 passes through the second sensing layer 24 at three places, the determination unit 36 determines that neither the single touch gesture nor the multi-touch gesture is performed (S112). In this instance, similarly to the case in which the object 18 passes through the second sensing layer 24 at two places or one place, the determination unit 36 determines that neither single touch gesture nor multi-touch gesture is performed.

Moreover, when the object 18 passes through the first sensing layer 16 at four or more places, the process proceeds from step S102 to S110 in the same manner as described above to execute respective processes of S110 to S112, and it is determined that neither single touch gesture nor multi-touch gesture is performed.

[1-3. Effect]

As described above, the determination unit 36 determines the presence or absence of a specific non-contact operation performed by the object 18 based on the number of passage places of the object 18 in each of the first sensing layer 16 and the second sensing layer 24.

For example, when the user intentionally performs a specific non-contact operation on the operation screen 10, the number of passage places of the object 18 in the first sensing layer 16 is considered to be one or two. Therefore, in this case, the determination unit 36 determines that the specific non-contact operation on the operation screen 10 is performed.

On the other hand, for example, when a part of the body or the like of the user unintentionally passes through the first sensing layer 16, the number of passage places of the object 18 in the first sensing layer 16 is considered to be three or more. Therefore, in this case, the determination unit 36 determines that the specific non-contact operation on the operation screen 10 is not performed.

Therefore, in the input device 2 according to Embodiment 1, it is possible to precisely determine the presence or absence of a specific non-contact operation on the operation screen 10, and it is possible to avoid an erroneous operation and the like of a device having the input device 2 as a user interface.

Embodiment 2

[2-1. Configuration of Input Device]

Figure 8:
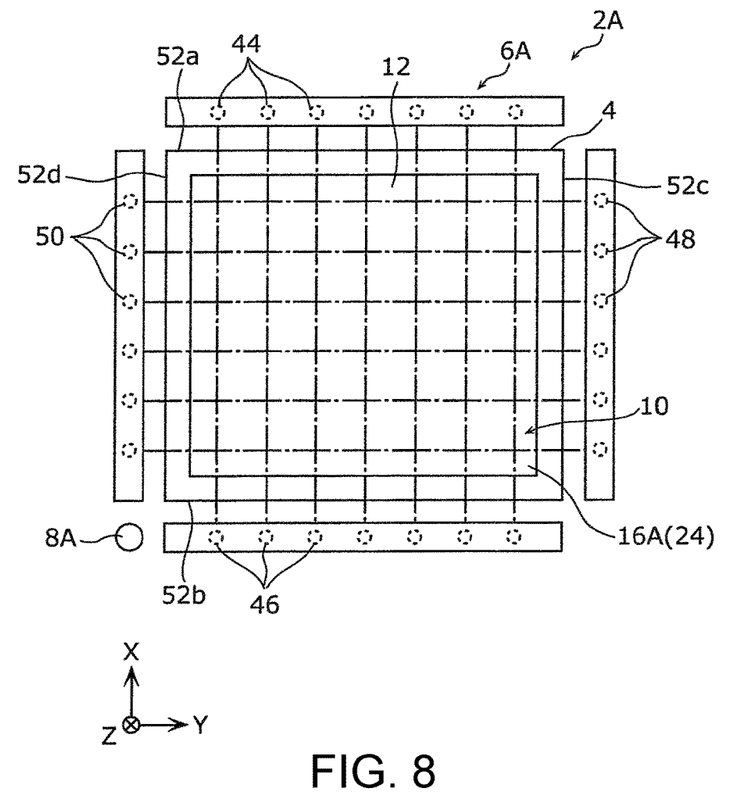
FIG. 8 is a plan view illustrating an input device according to Embodiment 2.
Figure 9:
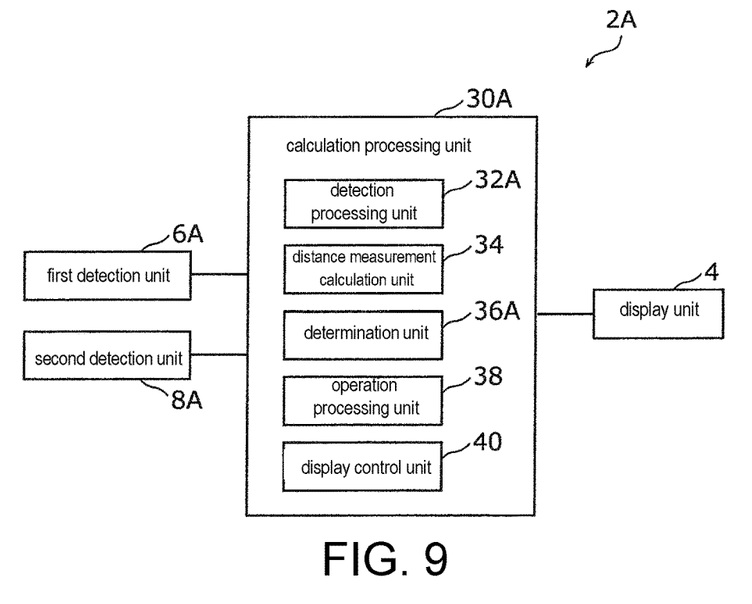
FIG. 9 is a block diagram illustrating a configuration of the input device according to Embodiment 2.

Next, a configuration of an input device 2A according to Embodiment 2 is described with reference to FIG. 8 and FIG. 9. FIG. 8 is a plan view illustrating the input device 2A according to Embodiment 2. FIG. 9 is a block diagram illustrating a configuration of the input device 2A according to Embodiment 2. Moreover, in the present embodiment, the same components as those in Embodiment 1 are denoted by the same reference numerals, and the description thereof is omitted.

As illustrated in FIG. 8, in the input device 2A according to Embodiment 2, respective configurations of a first detection unit 6A and a second detection unit 8A are different from the configurations in Embodiment 1.

Specifically, the first detection unit 6A includes an optical array sensor, and has a plurality of first light emitting units 44, a plurality of first light receiving units 46, a plurality of second light emitting units 48, and a plurality of second light receiving units 50.

The plurality of first light emitting units 44 is disposed at intervals along a first side 52a of the display unit 4. The plurality of first light receiving units 46 is disposed at intervals along a second side 52b facing the first side 52a of the display unit 4. That is, each of the plurality of first light emitting units 44 is disposed corresponding to each of the plurality of first light receiving units 46. Each of the plurality of first light emitting units 44 linearly irradiates an infrared ray (indicated by a one-dot chain line in FIG. 8) toward the plurality of first light receiving units 46. Each of the plurality of first light receiving units 46 receives the infrared ray from the plurality of first light emitting units 44.

The plurality of second light emitting units 48 is disposed at intervals along a third side 52c of the display unit 4. The plurality of second light receiving units 50 is disposed at intervals along a fourth side 52d facing the third side 52c of the display unit 4. That is, each of the plurality of second light emitting units 48 is disposed corresponding to each of the plurality of second light receiving units 50. Each of the plurality of second light emitting units 48 linearly irradiates an infrared ray (indicated by a one-dot chain line in FIG. 8) toward the plurality of second light receiving units 50. Each of the plurality of second light receiving units 50 receives the infrared ray from the plurality of second light emitting units 48.

A first sensing layer 16A is formed in a region surrounded by the plurality of first light emitting units 44, the plurality of first light receiving units 46, the plurality of second light emitting units 48, and the plurality of second light receiving units 50. When the object 18 (see FIG. 2) passes through a predetermined position of the first sensing layer 16A, the light from the first light emitting unit 44 and the second light emitting unit 48 corresponding to the predetermined position is blocked by the object 18, and thus the light is not received by the first light receiving unit 46 and the second light receiving unit 50 corresponding to the predetermined position. Accordingly, the first detection unit 6A detects the size (area) of the object 18 at the predetermined position of the first sensing layer 16A.

In addition, the second detection unit 8A detects the presence or absence of the object 18 in the second sensing layer 24. Similar to Embodiment 1, the second detection unit 8A includes a scan sensor. Moreover, the second detection unit 8A may include an optical array sensor similarly to the first detection unit 6A.

Furthermore, as illustrated in FIG. 9, in the input device 2A according to Embodiment 2, respective configurations of a detection processing unit 32A and a determination unit 36A of a calculation processing unit 30A are different from those in Embodiment 1.

The detection processing unit 32A computes the size of the object 18 in the first sensing layer 16A based on a detection signal from the first detection unit 6A. In addition, the detection processing unit 32A determines the presence or absence of the object 18 in the second sensing layer 24 based on a detection signal from the second detection unit 8A.

The determination unit 36A determines the presence or absence of a specific non-contact operation performed on the operation screen 10 by the object 18 based on respective computation results of the detection processing unit 32A and the distance measurement calculation unit 34. In the present embodiment, the specific non-contact operation is a non-contact single touch gesture on the operation screen 10, for example. A determination process by the determination unit 36A will be described later in detail.

[2-2. Operation of Input Device]

Figure 10:
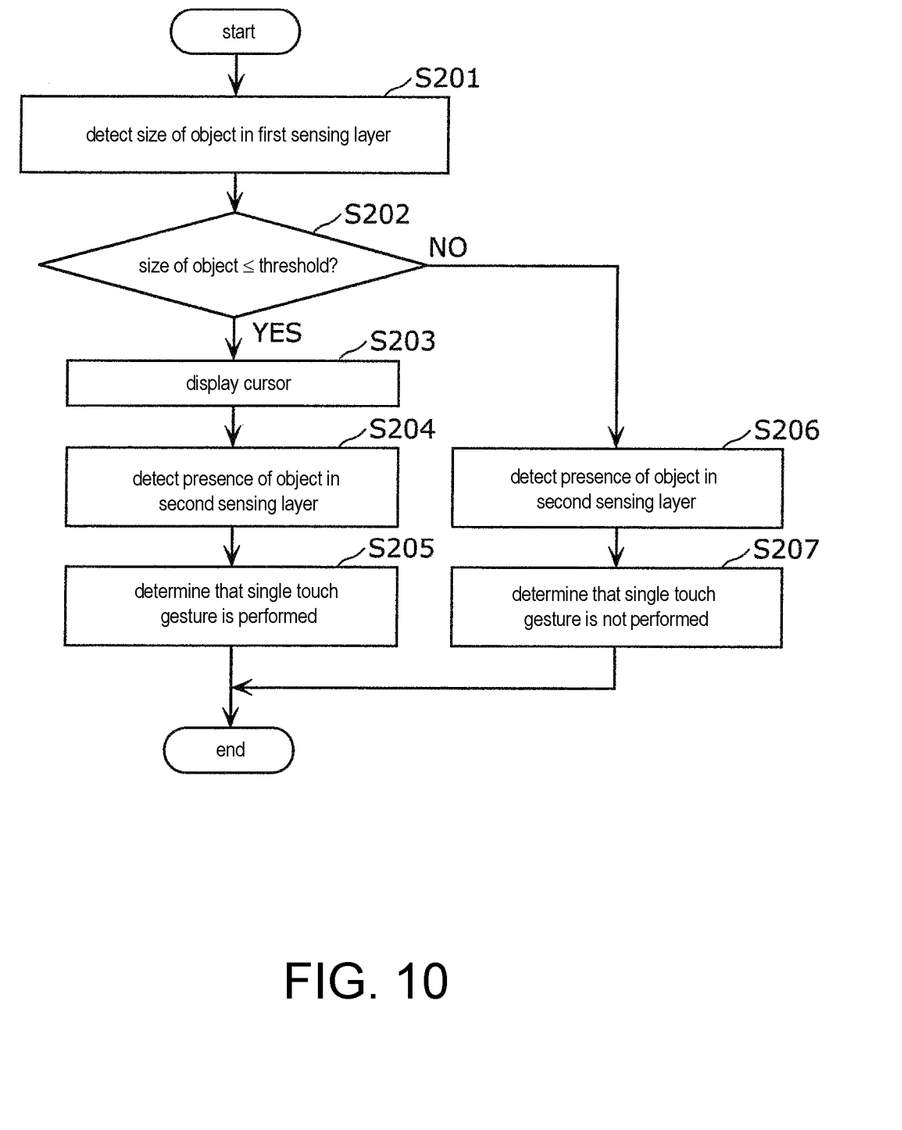
FIG. 10 is a flowchart illustrating an operation flow of the input device according to Embodiment 2.

Next, an operation of the input device 2A according to Embodiment 2 is described with reference to FIG. 10. FIG. 10 is a flowchart illustrating an operation flow of the input device 2A according to Embodiment 2.

As illustrated in FIG. 10, when the object 18 passes through the first sensing layer 16A, the first detection unit 6A detects the size of the object 18 in the first sensing layer 16A (S201). The detection processing unit 32A computes the size of the object 18 in the first sensing layer 16A based on a detection signal from the first detection unit 6A.

When one finger of the user passes through the first sensing layer 16A, the detection processing unit 32A determines that the size of the object 18 in the first sensing layer 16A is equal to or smaller than a threshold (YES in S202). Here, for example, the threshold is an area corresponding to the average size of one finger. Based on respective computation results of the detection processing unit 32A and the distance measurement calculation unit 34, the display control unit 40 displays the cursor 42 (see (b) of FIG. 5A) on the operation screen 10 when the object 18 passes through the first sensing layer 16A (S203).

Thereafter, when one finger of the user passes through the second sensing layer 24, the second detection unit 8A detects the presence of the object 18 (one finger) in the second sensing layer 24 (S204). The detection processing unit 32A determines that the object 18 is present in the second sensing layer 24 based on a detection signal from the second detection unit 8A. The determination unit 36A determines that a single touch gesture is performed when the object 18 passes through the second sensing layer 24 in a state that the cursor 42 is superimposed on the icon 14 (S205).

Returning to step S202 described above, for example, when a wrist of the user passes through the first sensing layer 16A, the detection processing unit 32A determines that the size of the object 18 in the first sensing layer 16A exceeds the threshold (NO in S202). In this case, the display control unit 40 does not display the cursor 42 on the operation screen 10.

Thereafter, when the wrist, the finger, or the like of the user passes through the second sensing layer 24, the second detection unit 8A detects the presence of the object 18 (such as the wrist or the finger) in the second sensing layer 24 (S206). The detection processing unit 32A determines that the object 18 is present in the second sensing layer 24 based on a detection signal from the second detection unit 8A. When the object 18 passes through the second sensing layer 24, the determination unit 36A determines that the single touch gesture is not performed (S207).

[2-3. Effect]

As described above, the determination unit 36A determines the presence or absence of a specific non-contact operation performed by the object 18 based on the size of the object in the first sensing layer 16A and the presence or absence of the object 18 in the second sensing layer 24.

For example, when the user intentionally performs a specific non-contact operation on the operation screen 10, the size of the object 18 in the first sensing layer 16A is considered to be smaller than or equal to the threshold. Therefore, in this case, the determination unit 36A determines that a specific non-contact operation on the operation screen 10 is performed.

On the other hand, for example, when a part of the body or the like of the user unintentionally passes through the first sensing layer 16A, the size of the object 18 in the first sensing layer 16A is considered to exceed the threshold. Therefore, in this case, the determination unit 36A determines that a specific non-contact operation on the operation screen 10 is not performed.

Therefore, in the input device 2A according to Embodiment 2, as in Embodiment 1, it is possible to precisely determine the presence or absence of a specific non-contact operation on the operation screen 10, and it is possible to avoid erroneous operation and the like of a device having the input device 2A as a user interface.

(Modification Example)

The input devices according to Embodiment 1 and Embodiment 2 of the disclosure have been described above, but the disclosure is not limited to these embodiments. For example, the above respective embodiments may be combined.

In each of the aforementioned embodiments, the operation screen 10 is displayed on the display surface 12 of the display unit 4 including the liquid crystal display panel. However, the disclosure is not limited thereto. The operation screen may be, for example, an aerial image (real image) formed on a display surface which is an aerial display region, or may be a projection image projected on a display surface on a screen by a projector.

In addition, in each of the above embodiments, the first detection unit 6 (6A) and the second detection unit 8 (8A) are separately configured. However, the disclosure is not limited thereto. These detection units may be integrally configured. That is, each function of the first detection unit 6 (6A) and the second detection unit 8 (8A) may be realized by one detection unit.

In addition, in each of the above embodiments, the first sensing layer 16 (16A) and the second sensing layer 24 are formed in the air. However, the disclosure is not limited thereto, and one or a plurality of third sensing layers may be further formed in the air between the second sensing layer 24 and the display surface 12 of the display unit 4. In this case, the input device 2 (2A) includes one or a plurality of third detection units that detects a passing state of the object 18 in one or a plurality of third sensing layers, and the determination unit 36 determines the presence or absence of a specific non-contact operation performed by the object 18 based on a detection result of each of the first detection unit 6 (6A), the second detection unit 8 (8A), and the one or plurality of third detection units. Moreover, the determination unit 36 may determine that a specific non-contact operation by the object 18 is performed when the object 18 passes through the third sensing layer formed at a position closest to the display surface 12 of the display unit 4.

In addition, in each of the above embodiments, the object 18 is the finger of the user. However, the disclosure is not limited thereto, and the object 18 may be, for example, an indicator stick, etc.

(Other Modification Examples and the Like)

In addition, specifically, each of the above devices may be configured as a computer system including a microprocessor, a ROM (Read Only Memory), a RAM (Random Access Memory), a hard disk drive, a display unit, a keyboard, a mouse, etc. A computer program is stored in the RAM or the hard disk drive. Each device achieves a function thereof by the microprocessor operating according to the computer program. Here, the computer program is configured by combining a plurality of instruction codes indicating instructions for the computer in order to achieve a predetermined function.

Furthermore, some or all of the components configuring each of the aforementioned devices may be configured by a single system LSI (Large Scale Integration). The system LSI is an ultra-multifunctional LSI manufactured by integrating a plurality of components on a single chip. Specifically, the system LSI is a computer system including a microprocessor, a ROM, a RAM, etc. A computer program is stored in the RAM. The system LSI achieves functions thereof by the microprocessor operating according to the computer program.

Furthermore, some or all of the components configuring each of the aforementioned devices may include an IC card or a single module that can be attached to and detached from each device. The IC card or the module is a computer system that includes a microprocessor, a ROM, a RAM, etc. The IC card or the module may include the ultra-multifunctional LSI described above. The IC card or the module achieves a function thereof by the microprocessor operating according to a computer program. This IC card or this module may have tamper resistance.

In addition, the disclosure may be the aforementioned methods. Further, the disclosure may be a computer program that realizes these methods by a computer, or may be a digital signal including the computer program.

Furthermore, in the disclosure, the computer program or the digital signal may be recorded in a computer-readable non-transitory recording medium, for example, a flexible disk, a hard disk, a CD-ROM, an MO, a DVD, a DVD- ROM, a DVD-RAM, a BD, a semiconductor memory, etc. In addition, the disclosure may be the digital signal recorded in these non-transitory recording media.

In addition, in the disclosure, the computer program or the digital signal may be transmitted via an electric communication line, a wireless or wired communication line, a network represented by the Internet, a data broadcast, etc.

In addition, the disclosure may be a computer system including a microprocessor and a memory, in which the memory stores the computer program, and the microprocessor operates according to the computer program.

In addition, another independent computer system may be used for implementation by recording the program or the digital signal in the non-transitory recording medium and transferring the program or the digital signal or by transferring the program or the digital signal via the network, etc.

Moreover, in each of the above embodiments, each component may be configured by dedicated hardware or may be realized by executing a software program suitable for each component. Each component may be realized by a program execution unit such as a CPU or a processor reading and executing a software program recorded in a recording medium such as a hard disk or a semiconductor memory.

The input device of the disclosure can be applied as, for example, a user interface for operating a device.

Other Configurations

According to one embodiment of the disclosure, it provides an input device for receiving a specific non-contact operation performed on an operation screen by an object, including: a display control unit that displays the operation screen on a display surface; a first detection unit that detects a passing state of the object in a first sensing layer in air formed to face the display surface; a second detection unit that detects a passing state of the object in a second sensing layer in air formed between the display surface and the first sensing layer, and a determination unit that determines presence or absence of the specific non-contact operation performed by the object based on respective detection results of the first detection unit and the second detection unit.

According to this embodiment, the passing state of the object in each of the first sensing layer and the second sensing layer is different between the case in which a user intentionally performs the specific non-contact operation on the operation screen and the case in which a part of the body of the user or the like unintentionally passes through each of the first sensing layer and the second sensing layer. For this reason, by determining the presence or absence of the specific non-contact operation performed by the object based on the passing state of the object in each of the first sensing layer and the second sensing layer, the determination unit can precisely determine the presence or absence of the specific non-contact operation on the operation screen. As a result, it is possible to avoid an erroneous operation and the like of a device having the input device as a user interface.

For example, in the input device according to one embodiment of the disclosure, the first detection unit may detect the number of passage places of the object in the first sensing layer, and the second detection unit may detect the number of passage places of the object in the second sensing layer.

According to this embodiment, the determination unit can determine the presence or absence of the specific non-contact operation performed by the object based on the number of passage places of the object in each of the first sensing layer and the second sensing layer.

For example, in the input device according to one embodiment of the disclosure, the specific non-contact operation may be a non-contact single touch gesture for a predetermined display on the operation screen made by the object, and when the object passes through the first sensing layer at one place and passes through the second sensing layer at one place, the determination unit determines that the single touch gesture is performed.

According to this embodiment, the determination unit can determine that the single touch gesture is performed based on the number of passage places of the object in each of the first sensing layer and the second sensing layer.

For example, in the input device according to one embodiment of the disclosure, the specific non-contact operation may be a non-contact multi-touch gesture on the operation screen made by the object, and when the object passes through the first sensing layer at two places and passes through the second sensing layer at two places, the determination unit determines that the multi-touch gesture is performed.

According to this embodiment, the determination unit can determine that the multi-touch gesture is performed based on the number of passage places of the object in each of the first sensing layer and the second sensing layer.

For example, in the input device according to one embodiment of the disclosure, when the object passes through the first sensing layer at three places or more and passes through the second sensing layer at one place or more, the determination unit may determine that the specific non-contact operation is not performed.

According to this embodiment, the determination unit can determine that the specific non-contact operation is not performed based on the number of passage places of the object in each of the first sensing layer and the second sensing layer.

For example, in the input device according to one embodiment of the disclosure, when the object passes through the first sensing layer, the display control unit may display a cursor on the operation screen.

According to this embodiment, since the display control unit displays a cursor on the operation screen when the object passes through the first sensing layer, the user can easily recognize that the object passes through the first sensing layer.

For example, in the input device according to one embodiment of the disclosure, the first detection unit may detect a size of the object in the first sensing layer, the second detection unit may detect presence or absence of the object in the second sensing layer, and the determination unit may determine that the specific non-contact operation is performed when the size of the object in the first sensing layer is smaller than or equal to a threshold and the object is detected in the second sensing layer, and determine that the specific non-contact operation is not performed when the size of the object in the first sensing layer exceeds the threshold and the object is detected in the second sensing layer.

According to this embodiment, the determination unit can determine the presence or absence of the specific non-contact operation performed by the object based on the size of the object in the first sensing layer and the presence or absence of the object in the second sensing layer.

For example, in the input device according to one embodiment of the disclosure, the input device may further include one or a plurality of third detection units that detects a passing state of the object in one or a plurality of third sensing layers in air formed between the display surface and the second sensing layer, and the determination unit determines the presence or absence of the specific non-contact operation performed by the object based on respective detection results of the first detection unit, the second detection unit, and the one or plurality of third detection units.

According to this embodiment, the determination unit can more precisely determine the presence or absence of the specific non-contact operation on the operation screen.

Moreover, the disclosure can be realized as a program for causing a computer to function as a characteristic processing unit included in an input device or a program for causing a computer to execute characteristic steps included in an aerial image display method. Needless to say, such a program can be distributed via a computer-readable non-temporary recording medium such as a CD-ROM (Compact Disc-Read Only Memory) or a communication network such as the Internet.

According to the input device of the embodiment of the disclosure, it is possible to precisely determine the presence or absence of a specific non-contact operation on an operation screen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An input device for receiving a specific non-contact multi-touch gesture operation performed on an operation screen by a single object, the input device comprising:
    a display controller that displays the operation screen on a display surface;
    a first detector that detects a passing state of a number of passage places of the single object in a first sensing layer in air formed to face the display surface;
    a second detector that detects a passing state of a number of passage places of the single object in a second sensing layer in air formed between the display surface and the first sensing layer, wherein the number of passage places of the single object are greater than 1;
    a processor, configured to performs a distance measurement to calculate a position of the number of passage places of the single object in the first sensing layer based on detection signals from the first detector and a position of the number of passage places of the single object in the second sensing layer based on detection signals from the second detector, determine presence or absence of the specific non-contact multi-touch gesture operation performed by the number of passage places of the single object based on respective detection results of the first detector and the second detector, and execute processing of a multiple-touch gesture corresponding to the specific non-contact operation based on a computation result of the distance measurement and the presence or absence of the specific non-contact operation from the display surface to the first sensing layer and the second sensing layer.

2. The input device according to claim 1,
wherein the specific non-contact multi-touch gesture operation performs a non-contact multi-touch gesture on the operation screen made by the single object, and
when the single object passes through the first sensing layer at two places and passes through the second sensing layer at two places, the processor is configured to determine that the multi-touch gesture is performed.

3. The input device according to claim 2, wherein when the single object passes through the first sensing layer at three places or more and passes through the second sensing layer at one place or more, the processor is configured to determine that the specific non-contact multi-touch gesture operation is not performed.

4. The input device according to claim 2, wherein when the single object passes through the first sensing layer, the display controller displays a cursor on the operation screen.

5. The input device according to claim 1, wherein when the single object passes through the first sensing layer at three places or more and passes through the second sensing layer at one place or more, the processor is configured to determine that the specific non-contact multi-touch gesture operation is not performed.

6. The input device according to claim 1, wherein when the single object passes through the first sensing layer, the display controller displays a cursor on the operation screen.

7. The input device according to claim 1,
wherein the first detector detects a size of the single object in the first sensing layer,
the second detector detects presence or absence of the single object in the second sensing layer, and
the processor determines that the specific non-contact operation is performed when the size of the single object in the first sensing layer is smaller than or equal to a threshold and the single object is detected in the second sensing layer, and
determines that the specific non-contact multi-touch gesture operation is not performed when the size of the single object in the first sensing layer exceeds the threshold and the single object is detected in the second sensing layer.

8. The input device according to claim 1,
wherein the input device further includes one or a plurality of third detector that detects a passing state of a number of passage places of the single object in one or a plurality of third sensing layers in air formed between the display surface and the second sensing layer, and
the processor determines the presence or absence of the specific non-contact multi-touch gesture operation performed by the single object based on respective detection results of the first detector, the second detector, and the one or plurality of third detectors.

* * * * *